United States Patent
Flexman

(10) Patent No.: US 7,354,973 B2
(45) Date of Patent: *Apr. 8, 2008

(54) TOUGHENED POLY(LACTIC ACID) COMPOSITIONS

(75) Inventor: Edmund Arthur Flexman, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 333 days.

This patent is subject to a terminal disclaimer.

(21) Appl. No.: 10/996,899

(22) Filed: Nov. 23, 2004

(65) Prior Publication Data

US 2005/0131120 A1    Jun. 16, 2005

Related U.S. Application Data

(60) Provisional application No. 60/529,208, filed on Dec. 12, 2003.

(51) Int. Cl.
*C08L 59/00* (2006.01)

(52) U.S. Cl. ............ 525/162; 525/166; 525/191; 525/176; 525/417; 525/419

(58) Field of Classification Search ............... 525/162, 525/166, 191, 176, 417, 419
See application file for complete search history.

(56) References Cited

U.S. PATENT DOCUMENTS 4,912,167 A * 3/1990 Deyrup et al. ............ 525/166
5,252,642 A * 10/1993 Sinclair et al. ............ 524/108
6,943,214 B2 * 9/2005 Flexman ................... 525/154

FOREIGN PATENT DOCUMENTS

| JP | 9-316310/97 A | 12/1997 |
|---|---|---|
| WO | WO 00/23520 | 4/2000 |
| WO | WO 03/014224(A1) | 2/2003 |
| WO | WO 03/082980(A1) | 10/2003 |
| WO | WO 2004/191642(A1) | 11/2004 |

OTHER PUBLICATIONS

International Search Report, for PCT/US2004/041695, International Filing Date Aug. 12, 2004.

* cited by examiner

*Primary Examiner*—Randy Gulakowski
*Assistant Examiner*—Olga Asinovsky

(57) ABSTRACT

Toughened poly(lactic acid) resin compositions comprising poly(lactic acid) and an impact modifier comprising an ethylene copolymer made from monomers (a) ethylene; (b) one or more olefins of the formula $CH_2=C(R^1)CO_2R^2$, where $R^1$ is hydrogen or an alkyl group with 2-8 carbon atoms and $R^2$ is an alkyl group with 1-8 carbon atoms, such as methyl, ethyl, or butyl; and (c) one or more olefins of the formula $CH_2=C(R^3)CO_2R^4$, where $R^3$ is hydrogen or an alkyl group with 1-6 carbon atoms, such as methyl, and $R^4$ is glycidyl. The ethylene copolymer may further be made from carbon monoxide monomers. The compositions may further comprise one or more ethylene/acrylate and/or ethylene/vinyl ester polymers, ionomers, and cationic grafting agents.

17 Claims, No Drawings

TOUGHENED POLY(LACTIC ACID) COMPOSITIONS

CROSS REFERENCE TO RELATED APPLICATIONS

This application claims the benefit of U.S. Provisional Application No. 60/529,208, filed Dec. 12, 2003.

FILED OF THE INVENTION

The present invention relates to thermoplastic poly(lactic acid) compositions toughened with a random ethylene copolymer comprising glycidyl groups. The compositions may further comprise one or more of ethylene/acrylate polymers, ionomers, and/or grafting catalysts.

BACKGROUND OF THE INVENTION

Poly(lactic acid) (i.e. PLA) can be derived biologically from naturally occurring sources other than petroleum and is biodegradable. However, physical limitations such as brittleness and slow crystallization may prevent easy injection molding of PLA into articles that have an acceptable degree of toughness for many applications.

It is desirable in the present invention to obtain a toughener for poly(lactic acid) that that allows poly(lactic acid) compositions to be easily melt-processed into a variety of articles with an acceptable level of toughness.

Japanese patent application publication H9-316310 discloses a poly(lactic acid) resin composition comprising PLA and a modified olefin compounds. Examples of those modified olefin compounds are ethylene-glycidyl methacrylate copolymers grafted with polystyrene, poly(dimethyl methacrylate), etc. and copolymers of ethylene and alpha-olefins grafted with maleic anhydride and maleimide.

SUMMARY OF THE INVENTION

Briefly stated, and in accordance with one aspect of the present invention, there is provided a poly(lactic acid) composition, comprising:

(i) about 60 to about 97 weight percent poly(lactic acid), and (ii) about 3 to about 40 weight percent of an impact modifier comprising an ethylene copolymer derived from copolymerizing:

(a) about 20 to about 95 weight percent ethylene;

(b) about 3 to about 70 weight percent of one or more olefins of the formula $CH_2=C(R^1)CO_2R^2$, where $R^1$ is hydrogen or an alkyl group with 1-8 carbon atoms and $R^2$ is an alkyl group with 1-8 carbon atoms; and (c) about 0.5 to about 25 weight percent of one or more olefins of the formula $CH_2=C(R^3)CO_2R^4$, where $R^3$ is hydrogen or an alkyl group with 1-6 carbon atoms, and $R^4$ is glycidyl, wherein the weight percentages of the poly(lactic acid) and the impact modifier are based on the total weight of the poly(lactic acid) and the impact modifier.

Pursuant to another aspect of the present invention, there is provided the addition of a monomer to the above stated copolymer composition (a)-(c) above, wherein the ethylene copolymer is further derived from copolymerizing (d) 0 to about 20 weight percent carbon monoxide.

DETAILED DESCRIPTION OF THE INVENTION

The present invention is a toughened thermoplastic composition comprising poly(lactic acid) and an impact modifier. The impact modifier will comprise a random ethylene copolymer and, optionally, other tougheners.

As used in the present invention, the term "poly(lactic acid)" ("PLA") refers to poly(lactic acid) homopolymers and copolymers containing at least 50 mole percent of repeat units derived from lactic acid or its derivatives and mixtures thereof having a number average molecular weight of 3,000-1,000,000 or preferably 10,000-700,000 or more preferably 20,000-600,000. Preferably, the poly(lactic acid) used in the present invention will contain at least 70 mole percent of repeat units derived from (e.g. made by) lactic acid or its derivatives. The poly(lactic acid) homopolymers and copolymers used in the present invention can be derived from d-lactic acid, l-lactic acid, or a mixture thereof. A mixture of two or more poly(lactic acid) polymers can be used. Poly(lactic acid) is typically prepared by the catalyzed ring-opening polymerization of the dimeric cyclic ester of lactic acid, which is referred to as "lactide." As a result, poly(lactic acid) is also referred to as "polylactide." Poly (lactic acid) may also be made by living organisms such as bacteria or isolated from plant matter that include corn, sweet potatoes, and the like. Poly(lactic acid) made by such living organisms may have higher molecular weights than those made synthetically.

Copolymers of lactic acid are typically prepared by catalyzed copolymerization of lactide or another lactic acid derivative with one or more cyclic esters and/or dimeric cyclic esters. Typical comonomers are glycolide (1,4-dioxane-2,5-dione), the dimeric cyclic ester of glycolic acid; $\alpha,\alpha$-dimethyl-$\beta$-propiolactone, the cyclic ester of 2,2-dimethyl-3-hydroxypropanoic acid; $\beta$-butyrolactone, the cyclic ester of 3-hydroxybutyric acid, $\delta$-valerolactone, the cyclic ester of 5-hydroxypentanoic acid; $\epsilon$-caprolactone, the cyclic ester of 6-hydroxyhexanoic acid, and the lactone of its methyl substituted derivatives, such as 2-methyl-6-hydroxyhexanoic acid, 3-methyl-6-hydroxyhexanoic acid, 4-methyl-6-hydroxyhexanoic acid, 3,3,5-trimethyl-6-hydroxyhexanoic acid, etc., the cyclic ester of 12-hydroxydodecanoic acid, and 2-p-dioxanone, the cyclic ester of 2-(2-hydroxyethyl)-glycolic acid. Aliphatic and aromatic diacid and diol monomers such as succinic acid, adipic acid, and terephthalic acid and ethylene glycol, 1,3-propanediol, and 1,4-butanediol may also be used. Copolymers may also be made by living organisms or isolated from plant matter as described above. The PLA will preferably comprise from about 60 to about 97 weight percent, or more preferably about 70 to 95 weight percent, or yet more preferably about 80 to about 90 weight percent of the composition of the present invention, based on the total amount of PLA and impact modifier used.

As used herein, the term "ethylene copolymer" refers to a polymer derived from (e.g. made from) ethylene and at least two additional monomers.

The ethylene copolymer impact modifier used in the present invention is at least one random polymer made by polymerizing monomers (a) ethylene; (b) one or more olefins of the formula $CH_2=C(R^1)CO_2R^2$, where $R^1$ is hydrogen or an alkyl group with 1-8 carbon atoms and $R^2$ is an alkyl group with 1-8 carbon atoms, such as methyl, ethyl, or butyl; and (c) one or more olefins of the formula $CH_2=C(R^3)CO_2R^4$, where $R^3$ is hydrogen or an alkyl group with 1-6 carbon atoms, such as methyl, and $R^4$ is glycidyl. Preferred monomers (b) are butyl acrylates. One or more of n-butyl acrylate, tert-butyl acrylate, iso-butyl acrylate, and sec-butyl acrylate may be used. A preferred ethylene copolymer is derived from ethylene, butyl acrylate, and glycidyl methacrylate and referred to as EBAGMA. Repeat units derived from monomer (a) will comprise about 20 to about 95 weight percent, or preferably comprise about 20 to about 90 weight percent, or more preferably about 40 to about 90 weight percent, or most preferably comprise about 50 to 80 weight percent of the of the total weight of the ethylene copolymer. Repeat units derived from monomer (b) will preferably comprise about 3 to about 70 weight percent, or more preferably about 3 to about 40 weight percent, or yet more preferably about 15 to about 35 weight percent, or even more preferably about 20 to about 35 weight percent of the total weight of the ethylene copolymer. Repeat units derived from monomer (c) will preferably comprise about 0.5 to about 25 weight percent, or more preferably about 2 to about 20 weight percent, or yet more preferably about 3 to about 17 weight percent of the total weight of the ethylene copolymer.

The ethylene copolymer derived from the monomers (a)-(c) above may additionally be derived from (d) carbon monoxide (CO) monomers. When present, repeat units derived from carbon monoxide will preferably comprise up to about 20 weight percent or more preferably comprise about 3 to about 15 weight percent of the total weight of the ethylene copolymer.

The ethylene copolymers used in the composition of the present invention are random copolymers that can be prepared by direct polymerization of the foregoing monomers in the presence of a free-radical polymerization initiator at elevated temperatures, preferably about 100 to about 270° C., and more preferably about 130 to about 230° C., and at elevated pressures, preferably at least 70 MPa, and more preferably about 140 to about 350 MPa. The ethylene copolymers may also be prepared using a tubular process, an autoclave, or a combination thereof, or other suitable processes. The ethylene copolymers may be not fully uniform in repeat unit composition throughout the polymer chain due to imperfect mixing during polymerization or variable monomer concentrations during the course of the polymerization. The ethylene copolymers are not grafted or otherwise modified post-polymerization.

The impact modifier used in the present invention may further comprise one or more copolymers of ethylene and an acrylate ester such ethyl acrylate or butyl acrylate or a vinyl ester such as vinyl acetate. When used, the copolymers of ethylene and an acrylate ester or vinyl acetate will preferably be present in about 1 to about 50 weight percent, or more preferably in about 5 to about 40 weight percent, or yet more preferably in about 10 to about 30 weight percent, based on the total weight of the impact modifier.

The impact modifier used in the present invention may further comprise at least one optional ionomer toughening agent. By an ionomer is meant a carboxyl group containing polymer that has been neutralized or partially neutralized with bivalent metal cations such as zinc, manganese, magnesium, cadmium, tin(II), cobalt(II), antimony(II), or sodium, or lithium and the like. Examples of ionomers are described in U.S. Pat. Nos. 3,264,272 and 4,187,358. Examples of suitable carboxyl group containing polymers include, but are not limited to, ethylene/acrylic acid copolymers and ethylene/methacrylic acid copolymers. The carboxyl group containing polymers may also be derived from one or more additional monomer, such as, but not limited to, butyl acrylate. Zinc(II) salts are preferred neutralizing agents. Ionomers are commercially available under the Surlyn® trademark from E.I. du Pont de Nemours and Co., Wilmington, Del. When used, the ionomers will preferably be present in about 1 to about 75 weight percent, or more preferably in about 5 to about 60 weight percent, or yet more preferably in about 10 to about 50 weight percent, based on the total weight of the impact modifier.

The composition of the present invention may further comprise at least one optional grafting catalyst. Grafting catalysts are described in U.S. Pat. No. 4,912,167. The grafting catalyst is a source of catalytic cations such as $Al^{3+}$, $Cd^{2+}$, $Co^{2+}$, $Cu^{2+}$, $Fe^{2+}$, $In^{3+}$, $Mn^{2+}$, $Nd^{3+}$, $Sb^{3+}$, $Sn^{2+}$, and $Zn^{2+}$. Suitable grafting catalysts include, but are not limited to, salts of hydrocarbon mono-, di-, or polycarboxylic acids, such as acetic acid and stearic acid. Inorganic salts such as carbonates may also be used. Examples of preferred grafting catalysts include, but are not limited to, stannous octanoate, zinc stearate, zinc carbonate, and zinc diacetate (hydrated or anhydrous). When used the grafting catalyst will preferably comprise about 0.01 to about 3 parts by weight per hundred parts by weight of poly(lactic acid) and impact modifier.

The compositions of the present invention may also optionally further comprise other additives such as about 0.5 to about 5 weight percent plasticizer; about 0.1 to about 5 weight percent antioxidants and stabilizers; about 3 to about 40 weight percent fillers; about 5 to about 40 weight percent reinforcing agents; about 0.5 to about 10 weight percent nanocomposite reinforcing agents; and/or about 1 to about 40 weight percent flame retardants. Examples of suitable fillers include glass fibers and minerals such as precipitated $CaCO_3$, talc, and wollastonite.

In an embodiment of the present invention, the composition is prepared by melt blending the poly(lactic acid) and ethylene copolymer until they are homogeneously dispersed to the naked eye and do not delaminate upon injection molding. Other materials (e.g. ethylene-acrylate copolymers, ionomers, grafting agents, and other additives) may be also uniformly dispersed in the poly(lactic acid)-ethylene copolymer matrix. The blend may be obtained by combining the component materials using any melt-mixing method known in the art. For example: 1) the component materials may be mixed to homogeneity using a melt-mixer such as a single or twin-screw extruder, blender, kneader, Banbury mixer, roll mixer, etc. to give a resin composition; or 2) a portion of the component materials can be mixed in a melt-mixer, and the rest of the component materials subsequently added and further melt-mixed until homogeneous.

The compositions of the present invention may be molded into articles using any suitable melt-processing technique. Commonly used melt-molding methods known in the art such as injection molding, extrusion molding, blow molding, and injection blow molding are preferred. The compositions of the present invention may be formed into films and sheets by extrusion to prepare both cast and blown films. These sheets may be further thermoformed into articles and structures that may be oriented from the melt or at a later stage in the processing of the composition. The compositions of the present invention may also be used to form fibers and filaments that may be oriented from the melt or at a later stage in the processing of the composition. Examples of articles that may be formed from the compositions of the present invention include, but are not limited to, knobs, buttons, disposable eating utensils, thermoformable sheeting and the like.

EXAMPLES

Compounding: The compositions of the examples were prepared by compounding in a 28 mm or 30 mm co-rotating Werner & Pfleiderer twin screw extruder with a screw design comprising two hard working segments followed by a vacuum port and twin hole die. The molten material was discharged into a water quench tank prior to being cut by a strand cutter.

Molding: Molding was done on a 6-ounce reciprocating screw molding machine into an ASTM mold that made a single 1/8" tensile bar and two 5"×1/8" flexural bars using a screw speed of 60 rpm, a fast injection rate, and a back pressure of 50 psi.

Notched Izod impact strength measurements were made according to ASTM D256. Each 1/8" flexural bar was cut in half and each half was notched in the middle and tested.

The PLA used in the following examples refers to a poly(lactic acid) homopolymer with an inherent viscosity of 1.49 as measured in 1:1 TFA/methylene chloride at 0.4 g/deciliter at 23° C. It contains minor amounts of normal commercial additives.

EBAGMA-5 is an ethylene/n-butyl acrylate/glycidyl methacrylate terpolymer derived from 66.75 weight percent ethylene, 28 weight percent n-butyl acrylate, and 5.25 weight percent glycidyl methacrylate. It has a melt index of 12 g/10 minutes as measured by ASTM method D1238.

EBAGMA-12 is an ethylene/n-butyl acrylate/glycidyl methacrylate terpolymer derived from 66 weight percent ethylene, 22 weight percent n-butyl acrylate, and 12 weight percent glycidyl methacrylate. It has a melt index of 8 g/10 minutes as measured by ASTM method D1238.

EBAGMA-17 is an ethylene/n-butyl acrylate/glycidyl methacrylate terpolymer derived from 63 weight percent ethylene, 20 weight percent n-butyl acrylate, and 17 weight percent glycidyl methacrylate. It has a melt index of 15 g/10minutes as measured by ASTM method D1238.

E/GMA is an ethylene/glycidyl methacrylate copolymer derived from 98.2 weight percent ethylene and 1.8 weight percent glycidyl methacrylate.

E/BA is an ethylene/butyl acrylate copolymer derived from 27 weight percent butyl acrylate and 73 weight percent ethylene.

EPDM is a polymer derived from 68 weight percent ethylene, 28 weight percent propylene, and 4 weight percent 1,3-hexadiene and having a Mooney viscosity ML$_4$ at 250° C. of 35.

EVA is an ethylene/vinyl acetate copolymer derived from 60 weight percent ethylene and 40 weight percent vinyl acetate and having a melt index of 4.0 at 190° C. with a weight of 2.16 kg.

Ionomer refers to a terpolymer derived from 67 weight percent ethylene, 24 weight percent n-butyl acrylate, and 9 weight percent methacrylic acid and that has been 35% neutralized with zinc.

SnOct$_2$ is stannous octanoate.

Comparative Examples 1-5

Each of the materials for each Comparative Example shown in Table 1 was compounded in a twin screw extruder with the barrels and die set to about 190° C. at 200 rpm and about 30 to about 40 pounds per hour. The melt temperatures were about 225-232° C. The resulting compositions were molded into ASTM test bars and their notched Izod impact resistance was determined. The ingredient quantities in Table 1 are given in weight percent based on the total weight of the composition.

TABLE 1

|  | Comp. Ex. 1 | Comp. Ex. 2 | Comp. Ex. 3 | Comp. Ex. 4 | Comp. Ex. 5 |
|---|---|---|---|---|---|
| PLA | 100 | 80 | 80 | 80 | 80 |
| E/GMA | — | 20 | — | 10 | — |
| E/BA | — | — | 20 | — | — |
| EPDM | — | — | — | 10 | — |
| Ionomer | — | — | — | — | 20 |
| Notched Izod (J/m) | 31.0 | 56.6 | 68.4 | 58.2 | 79 |

Examples 1-7

Each of the materials for each Comparative Example shown in Table 1was compounded in a twin screw extruder with the barrels and die set to about 170° C. at 150 rpm and about 25 pounds per hour. The melt temperatures were about 205-228° C. The resulting compositions were molded into ASTM test bars and their notched Izod impact resistance was determined. The ingredient quantities in Table 2 are given in weight percent based on the total weight of the composition.

TABLE 2

|  | Ex. 1 | Ex. 2 | Ex. 3 | Ex. 4 | Ex. 5 | Ex. 6 | Ex. 7 |
|---|---|---|---|---|---|---|---|
| PLA | 95 | 90 | 80 | 80 | 80 | 70 | 60 |
| EBAGMA-17 | 5 | 10 | — | — | 20 | 30 | 40 |
| EBAGMA-5 | — | — | 20 | — | — | — | — |
| EBAGMA-12 | — | — | — | 20 | — | — | — |
| Notched Izod (J/m) | 39.5 | 51.8 | 122.8 | 154.9 | 176.2 | 752.9 | 619.4 |

Examples 8-12

Each of the materials for each Example shown in Table 3 was compounded in a twin screw extruder. The barrels and die were set to about 170° C. in the case of Examples 8 and 9 and about 180° C. in the case of Examples 10-12. The extruder operated at about 150 rpm in the case of Examples 8 and 9 and about 200 rpm in the case of Examples 10-12. Example 8 was run at about 30 pounds per hour, Example 9 at about 40pounds per hour, Example 10 at about 30 pounds per hour, and Examples 11 and 12 at about 50 pounds per hour. The resulting compositions were molded into ASTM test bars and their notched Izod impact resistance was determined. The ingredient quantities in Table 3 are given in weight percent based on the total weight of the composition.

TABLE 3

|  | Ex. 8 | Ex. 9 | Ex. 10 | Ex. 11 | Ex. 12 |
|---|---|---|---|---|---|
| PLA | 80 | 80 | 80 | 90 | 80 |
| EBAGMA-17 | 10 | 10 | 20 | — | — |
| EBAGMA-12 | — | — | — | 10 | 20 |
| EVA | 10 | — | — | — | — |
| Ionomer | — | 10 | — | — | — |
| SnOct$_2$ | — | — | 0.001 | 0.001 | 0.001 |
| Notched Izod (J/m) | 154.9 | 1388.4 | 400.5 | 57.7 | 102.5 |

It is therefore, apparent that there has been provided in accordance with the present invention, a toughened poly It is claimed:

1. A poly(lactic acid) composition, comprising:
   (i) about 60 to about 97 weight percent poly(lactic acid), and
   (ii) about 3 to about 40 weight percent of an impact modifier comprising an ethylene copolymer derived from copolymerizing:
      (a) about 20 to about 95 weight percent ethylene;
      (b) about 3 to about 70 weight percent of one or more olefins of the formula $CH_2=C(R^1)CO_2R^2$, where $R^1$ is hydrogen or an alkyl group with 1-8 carbon atoms and $R^2$ is an alkyl group with 1-8 carbon atoms; and
      (c) about 0.5 to about 25 weight percent of one or more olefins of the formula $CH_2=C(R^3)CO_2R^4$, where $R^3$ is hydrogen or an alkyl group with 1-6 carbon atoms, and $R^4$ is glycidyl,
   wherein the weight percentages of the poly(lactic acid) and the impact modifier are based on the total weight of the poly(lactic acid) and the impact modifier.

2. The composition of claim 1, wherein (a) is about 20 to about 90 weight percent ethylene.

3. The composition of claim 1, wherein (a) is about 40 to about 90 weight percent ethylene.

4. The composition of claim 1, wherein (a) is about 50 to about 80 weight percent ethylene.

5. The composition of claim 1, wherein (b) is about 20 to about 35 weight percent of one or more olefins of the formula $CH_2=C(R^1)CO_2R^2$, where $R^1$ is hydrogen or an alkyl group with 1-8 carbon atoms and $R^2$ is an alkyl group with 1-8 carbon atoms.

6. The composition of claim 1, wherein (c) is about 3 to about 17 weight percent of at least one olefin of the formula $CH_2=C(R^3)CO_2R^4$, where $R^3$ is hydrogen or an alkyl group with 1-6 carbon atoms, and $R^4$ is glycidyl.

7. The composition of claim 1, wherein the ethylene copolymer is further derived from copolymerizing (d) 0 to about 20 weight percent carbon monoxide.

8. The composition of claim 1 wherein (b) is butyl acrylate and (c) is glycidyl methacrylate.

9. The composition of claim 1 wherein the impact modifier (ii) further comprises about 1 to about 75 weight percent of one or more ionomers, based on the total weight of the impact modifier.

10. The composition of claim 1, wherein the impact modifier (ii) further comprises 10 to 50 weight percent of one or more ionomers, based on the total weight of the impact modifier.

11. The composition of claim 1, wherein the impact modifier (ii) further comprises up to about 50 weight percent of one or more copolymers of ethylene and an acrylate ester or vinyl acetate, based on the total weight of the impact modifier.

12. The composition of claim 1, further comprising one or more cationic grafting catalysts.

13. The composition of claim 12, wherein the cationic grafting catalysts are selected from the group consisting of salts of hydrocarbon mono-, di-, or polycarboxylic acids.

14. The composition of claim 12 wherein the cationic grafting catalysts are one or more of stannous octanoate, zinc stearate, and zinc diacetate.

15. A molded article comprising the composition of claim 1.

16. An extruded article comprising the composition of claim 1.

17. A thermoformed article comprising the composition of claim 1.

* * * * *